US010287496B2

(12) United States Patent
Pohl-Klein et al.

(10) Patent No.: US 10,287,496 B2
(45) Date of Patent: May 14, 2019

(54) METHOD FOR PRODUCING A POWDERED PRECURSOR MATERIAL, POWDERED PRECURSOR MATERIAL AND USE THEREOF (71) Applicants: OSRAM GmbH, Munich (DE); OSRAM Opto Semiconductors GmbH, Regensburg (DE)

(72) Inventors: Bianca Pohl-Klein, Gilching (DE); Juliane Kechele, Stadtbergen (DE); Simon Dallmeir, Koenigsbrunn (DE)

(73) Assignees: OSRAM GMBH, München (DE); OSRAM Opto Semiconductors GmbH, Regensburg (DE)

( * ) Notice: Subject to any disclaimer, the term of this patent is extended or adjusted under 35 U.S.C. 154(b) by 440 days.

(21) Appl. No.: 14/761,600

(22) PCT Filed: Jan. 10, 2014

(86) PCT No.: PCT/EP2014/050384
§ 371 (c)(1),
(2) Date: Jul. 16, 2015

(87) PCT Pub. No.: WO2014/111312
PCT Pub. Date: Jul. 24, 2014

(65) Prior Publication Data
US 2015/0361339 A1    Dec. 17, 2015

(30) Foreign Application Priority Data
Jan. 16, 2013   (DE) .......................... 10 2013 100 429

(51) Int. Cl.
*C09K 11/77*    (2006.01)
*C09K 11/08*    (2006.01)
(Continued)

(52) U.S. Cl.
CPC ........ *C09K 11/7734* (2013.01); *C04B 35/581* (2013.01); *C04B 35/584* (2013.01);
(Continued)

(58) Field of Classification Search
CPC ............ C09K 11/7734; C09K 11/0883; C09K 11/7728; C09K 11/646; C04B 35/581; C04B 35/584; C04B 35/591
See application file for complete search history.

(56) References Cited

U.S. PATENT DOCUMENTS

2006/0043337 A1    3/2006    Sakane et al.
2007/0114561 A1*   5/2007    Comanzo ........... C09K 11/7734
                                                                 257/103
(Continued)

FOREIGN PATENT DOCUMENTS

CN    1934220 A    3/2007
CN    1969029 A    5/2007
(Continued)

OTHER PUBLICATIONS

Medraj et al. Understanding AlN sintering through computational thermodynamics combined with experimental investigation. Journal of Materials Processing Technology 161 (2005) 415-422. (Year: 2005).*
(Continued)

*Primary Examiner* — John E Uselding
(74) *Attorney, Agent, or Firm* — McDermott Will & Emery LLP (57) ABSTRACT A method is provided for producing a pulverulent precursor material of the general formula $M1_xM2_y(Si,Al)_{12}(O,N)_{16}$ or $M1_{2-z}M2_zSi_8Al_4N_{16}$ having the method steps A) producing a pulverulent mixture of starting materials, B) calcining the mixture under a protective gas atmosphere and subsequent grinding, wherein in method step A) at least one nitride with
(Continued)

a specific surface area of greater than 2 $m^2/g$ is selected as starting material. A pulverulent precursor material and the use thereof are additionally provided.

9 Claims, 7 Drawing Sheets

(51) Int. Cl.
  *C04B 35/581* (2006.01)
  *C04B 35/584* (2006.01)
  *C04B 35/591* (2006.01)
  *C09K 11/64* (2006.01)

(52) U.S. Cl.
  CPC ........ *C04B 35/591* (2013.01); *C09K 11/0883* (2013.01); *C09K 11/646* (2013.01); *C09K 11/7728* (2013.01); *C04B 2235/3203* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3852* (2013.01); *C04B 2235/3865* (2013.01); *C04B 2235/3873* (2013.01); *C04B 2235/442* (2013.01); *C04B 2235/445* (2013.01); *C04B 2235/446* (2013.01); *C04B 2235/449* (2013.01); *C04B 2235/5409* (2013.01); *C04B 2235/5436* (2013.01); *C04B 2235/5445* (2013.01); *C04B 2235/664* (2013.01)

(56) References Cited

U.S. PATENT DOCUMENTS

| | | | |
|---|---|---|---|
| 2009/0085465 | A1 | 4/2009 | Hirosaki et al. |
| 2009/0091237 | A1 | 4/2009 | Hirosaki et al. |
| 2009/0272995 | A1 | 11/2009 | Ito et al. |

FOREIGN PATENT DOCUMENTS

| | | | |
|---|---|---|---|
| EP | 1445295 | A1 | 8/2004 |
| EP | 1555307 | A2 | 7/2005 |
| EP | 1630219 | A2 | 3/2006 |
| EP | 1854864 | A1 | 11/2007 |
| EP | 2022835 | A1 | 2/2009 |
| EP | 2314659 | A1 | 4/2011 |
| EP | 2543714 | A1 | 1/2013 |
| EP | 2554629 | A1 | 2/2013 |
| JP | 2005162808 | A | 6/2005 |
| JP | 2006070109 | A | 3/2006 |
| JP | 2006152069 | A | 6/2006 |
| JP | 2006321921 | A | 11/2006 |

OTHER PUBLICATIONS

Laarz et al. Dissolution and Deagglomeration of Silicon Nitride in Aqueous Medium. J. Am. Ceram. Soc., 83 [10] 2394-2400 (Year: 2000).*

Xie, R-J et al., "Optical Properties of $Eu^{2+}$ in $\alpha$-SiAlON", J. Phys. Chem. B 2004, 108, pp. 12027-12031, American Chemical Society.

Liu, L., et al., "Facil synthesis of Ca-$\alpha$-SiAlON:$Eu^{2+}$ phosphor by the microwave sintering method and its photoluminescence properties", Chinese Science Bulletin, Mar. 2013, vol. 58, Issue 7, pp. 708-712, doi: 10.1007/s11434-012-5528-x.

* cited by examiner

METHOD FOR PRODUCING A POWDERED PRECURSOR MATERIAL, POWDERED PRECURSOR MATERIAL AND USE THEREOF

SUMMARY

The invention relates to a method for producing a pulverulent precursor material, a pulverulent precursor material and use of the pulverulent precursor material.

This patent application claims priority from German patent application 10 2013 100 429.6, the disclosure content of which is hereby included by reference.

Ceramic materials have been used for some years in radiation-emitting components, such as for example light-emitting diodes (LED). For example, ceramic luminescent materials are used which convert radiation of a first wavelength emitted by a radiation source into a radiation with a modified second wavelength. Ceramic materials are distinguished inter alia by an elevated thermal loading capacity due to the better heat dissipation compared with volume potting. To produce ceramic materials, a particularly finely divided, reactive precursor is necessary, which is sufficiently sinterable to be subjected to ceramic processes such as tape casting or spark plasma sintering (SPS).

One object is to provide an improved method for producing a pulverulent precursor material. Further objects consist in providing a pulverulent precursor material and the use thereof. These objects are achieved by the subjects with the features of the independent claims. Advantageous embodiments and further developments constitute the subject matter of the dependent claims.

A method is provided for producing a pulverulent precursor material of the general formula $M1_xM2_y(Si,Al)_{12}(O,N)_{16}$ or $M1_{2-z}M2_zSi_8Al_4N_{16}$. Therein M1 is at least one of Li, Mg, Ca, Y and the group of lanthanoids without Ce and La, M2 is at least one of Ce, Pr, Eu, Tb, Yb and Er and $0.3 \leq x+y \leq 1.5$ and $0 \leq y \leq 0.7$ and $0 \leq z \leq 2$ apply. The method comprises the following method steps: A) producing a pulverulent mixture of starting materials, B) calcining the mixture under a protective gas atmosphere and subsequent grinding, wherein in method step A) at least one nitride with a specific surface area of more than 2 m²/g is selected as starting material.

The above-stated general empirical formulae generally describe sialons and SiAlNs. M2 acts herein as activator. If y or z>0, the compounds are doped and have wavelength-converting properties. Depending on M1 and M2 and the O/N ratio, the emission wavelength thereof may be adjusted from greenish yellow to orange-red.

A protective gas atmosphere may for example be understood to mean a reducing atmosphere.

The calcined mixture may be additionally screened after grinding, as required.

Using the above-stated method, particularly finely divided pulverulent precursor materials may be produced. By selecting suitable synthesis parameters and starting materials, it is possible to influence the particle size or average grain size of the resultant precursor material. In particular, the reactivity of the nitrides used plays a part. In method step A), AlN and/or $Si_3N_4$ may for example be used as the nitride. A crucial factor for the reactivity of such nitrides is their specific surface area. Thus, for example, an $Si_3N_4$ with a specific surface area of more than 2 m²/g may be used and/or an AlN with a specific surface area ≥3 m²/g. The more reactive is/are the nitride(s) used, the more finely divided is the produced precursor material.

In the method, method step B) may be performed at least once. For example, method step B) may be repeated 1 to 5 times. The particle size of the resultant precursor material may be influenced by the number of calcining operations with in each case subsequent grinding and optional screening. After the final instance of calcining, the mixture is ground and screened.

In the method, the calcining in method step B) may be performed at a temperature selected from the range 1300° C. to 1600° C., in particular from the range 1300° C. to 1550° C. By selection of the temperature, which may also be denoted the maximum temperature or maximum synthesis temperature, from the range 1300° C. to 1600° C., the method may be performed at lower temperatures than conventional methods. This likewise allows a particularly small particle size to be established. The application of lower temperatures in method step B) leads to improved sinterability when the precursor material is further processed.

The calcining in method step B) may include a holding time which is selected from the range of 1 minute to 24 hours, in particular from the range of 1 hour to 8 hours, for example from the range of 1 hour to 4 hours. Holding time is understood to be the time during which the maximum temperature is maintained. Together with a heating and cooling time, the holding time results in the total calcining period. The holding time may likewise influence the particle size of resultant precursor material.

Further parameters for influencing and adjusting the particle size of the resultant precursor material are the heating and cooling ramps. These may be selected for example depending on oven type.

Furthermore, in method step A) of the method at least one fluxing agent may be added to the mixture of starting materials. The fluxing agent may be selected from a group comprising boric acid, borates, chlorides, fluorides and mixtures thereof. For example, $CaF_2$, $AlF_3$ and/or $NH_4Cl$ may be selected as fluxing agents. Through the selection and concentration of fluxing agents as additions in the production of the pulverulent precursor material, the morphology of the resultant precursor material may be influenced. It is for example possible to control whether the precursor material is spherical or rod-shaped. The use of fluxing agents may also play a critical role in the ceramic production process from the precursor material. Likewise, the morphology of the precursor material adjusted by means of the fluxing agent(s) may be of relevance to the ceramic production process.

The fluxing agent may be added in method step A) in a concentration which is selected from the range 0.001 mol to 0.2 mol, in particular from the range 0.005 mol to 0.05 mol.

In the method, the pulverulent precursor material may be washed in base and/or acid in a method step C) following method step B). The acid may be selected for example from a group comprising hydrochloric acid, sulfuric acid, nitric acid, hydrofluoric acid, phosphoric acid and mixtures thereof. The base solution may be selected from a group comprising for example potassium hydroxide solution, sodium hydroxide solution and mixtures thereof. Such washing operations may increase efficiency when a doped pulverulent precursor material is produced.

A pulverulent precursor material is furthermore provided which is provided using a method according to the above explanations. The pulverulent precursor material may have an average grain size which is less than 4 μm, in particular less than 2.3 μm. Hereinafter, unless otherwise stated, the value $d_{50}$, which is defined such that 50% of the material lies within or below this size or this diameter, is understood as the average grain size, which may also be called the average grain diameter. The term grain size is intended in this connection to comprise both the primary grain size of an individual grain and the agglomerate grain size.

The method thus provides a particularly finely divided pulverulent precursor material, which is suitable for use in radiation-emitting components, such as for example LEDs. This includes both the use of the precursor in the form of powder as a pulverulent conversion material and also further processing of the precursor to yield ceramic luminescent material converters or diffusion barriers and use of these in radiation-emitting components. The latter is determined above all by the good sinterability of the finely divided material.

Use of the pulverulent precursor material to form at least one ceramic layer of a radiation-emitting component is furthermore provided. The radiation-emitting device may for example comprise an LED. The pulverulent precursor material may in this case completely form a layer of the component or be present together with other materials in such a layer. The ceramic precursor material may be present in further processed form to yield a ceramic or ceramic layer, produced using a ceramic production process, for example spark plasma sintering (SPS) or tape casting.

The ceramic layer may be an interlayer between a first layer containing a first luminescent material and a second layer containing a second luminescent material. The interlayer may here be a diffusion barrier layer. The first and second layers may likewise be ceramic. The first luminescent material may be an oxide luminescent material, while the second luminescent material may be a nitride luminescent material. Examples of such luminescent materials are YAG:Ce, LuAG:Ce, $M_2Si_5N_8$:Eu (M=Ca, Sr, Ba) and (Ca, Sr)AlSiN$_3$:Eu.

Use of the precursor material in such an interlayer, for example in the diffusion barrier layer, may prevent a reaction between the oxide luminescent material and the nitride luminescent material during production of the ceramic layers containing these luminescent materials. An oxide luminescent material may for example be a yellow-green emitting luminescent material, and the nitride luminescent material for example a red emitting luminescent material. The yellow-green luminescent materials necessary for generating white light would react with the necessary red luminescent materials during production of ceramic layers. In the process, damage to complete decomposition of one or both materials may arise. If, during the ceramic production process, a precursor material as described above is applied between the two luminescent materials as a reaction barrier, such a reaction may be avoided.

To produce the layer sequence first layer—interlayer—second layer, the individual layers may be sintered one after the other or by means of a common sintering step. The first layer may also be manufactured and then simultaneously the interlayer and the second layer. Production methods for the layers may for example be selected from tape casting and subsequent sintering or spark plasma sintering.

In their function as diffusion barriers, the sialon and SiAlN material class may stop the diffusion of $Li^+$, $Mg^{2+}$, $Ca^{2+}$, $Y^{3+}$, $N^{3-}$, $O^{2-}$, $Al^{3+}$ and $Si^{4+}$ ions, ions of the metals of the lanthanoid group, and the ions of the respective activators of nitride and oxide luminescent materials and vice versa. This is made possible by the structural flexibility and the associated phase width of the sialons and SiAlNs.

By selecting whether and which activator is or is not used, the described undoped or doped pulverulent precursor materials may influence the colour location of the resultant ceramic comprising all the layers. For instance, a ceramic interlayer, which is produced from the described doped precursor material, for example itself contributes to the total emission spectrum of the conversion ceramic comprising the first and second layers.

The use of doped precursor materials, which themselves have wavelength-converting properties, as a material for the interlayer allows, as a result of the intrinsic emission contribution, control or adaptation of the total emission spectrum of the radiation-emitting component or the colour location and colour temperature thereof. The doping rate of the precursor material, which is further processed to yield the interlayer, is also critical with regard to diffusion of the activator ion of the red or green-yellow luminescent materials of the adjoining first and second layers, between which the interlayer is arranged. The doping rate may for example lie in the range of 0.001 mol to 0.2 mol, in particular in the range of 0.01 mol to 0.1 mol. The higher the proportion of activators in the precursor material, the less diffusion takes place and the less are the luminescent properties of the materials of the first and second layers influenced during ceramic production.

The pulverulent precursor material may moreover be used to form a layer which is a wavelength conversion layer. The wavelength conversion layer may be present in an LED, for example a full-conversion LED. In the wavelength conversion layer, a precursor material may thus be used which is a luminescent material precursor and has a small particle size and thus good sinterability. Use in a wavelength conversion layer may proceed as a powder or as a further processed ceramic. In both cases, the wavelength conversion layer may be arranged in the beam path of the LED and convert an emitted primary radiation partially or completely into a secondary radiation with a different wavelength.

The ceramic wavelength conversion layer may be produced from the precursor materials described using the conventional ceramic production methods as indicated in connection with the interlayer.

In order to achieve a small precursor particle size required for the ceramic production process, coarse-grained powders would have to be comparatively heavily ground. However, this leads inter alia to poorer material efficiency due to lattice defects and impurities, which are introduced into the milled material by the long grinding process. Because the pulverulent precursor material is produced with reactive starting materials, it is already so finely divided that extended grinding processes can be avoided. Therefore, the pulverulent precursor material may be processed to yield efficient ceramic wavelength conversion layers.

Alternatively, the doped, pulverulent precursor material, which already has wavelength-converting properties, may be used without further processing as a pulverulent conversion material in a radiation-emitting device. To this end, the powder may for example be embedded in silicone or other suitable matrix materials. The embedded powder may be present in the radiation-emitting device for example in the form of a layer, film or potting compound.

Further advantages and advantageous embodiments of the method, the pulverulent precursor material and use thereof are revealed by the following exemplary embodiments and figures.

DETAILED DESCRIPTION

A comparative example for producing a coarse-grained powder and a number of exemplary embodiments for producing finely divided pulverulent precursor materials are indicated below.

Figure 1:
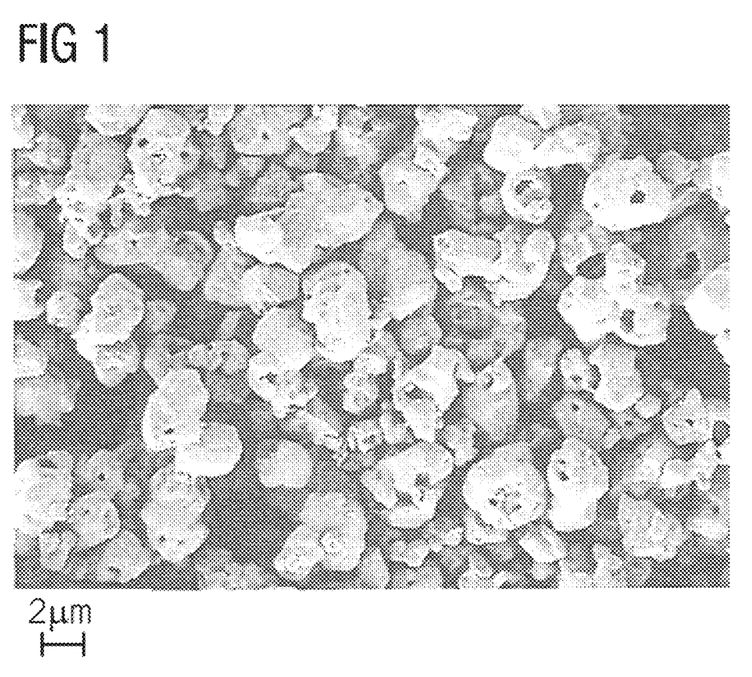
FIG. 1 shows an example of an electron micrograph of a precursor material produced using a conventional method.

Comparative Example: Production of $(Ca,Eu)_2Si_8Al_4N_{16}$ 48 g $Ca_3N_2$, 82 g AlN, 187 g $Si_3N_4$ (specific surface area roughly 1 $m^2/g$) and 4 g $Eu_2O_3$ are weighed out and homogenised under a protective gas atmosphere. Then the lightly compacted starting material mixture is calcined for several hours under a reducing atmosphere in the tube or chamber furnace at temperatures of between 1500° C. and 1800° C. Then further calcining operations may proceed, likewise under a reducing atmosphere, between 1500° C. and 1800° C. Between the calcining operations, the calcined cake is ground, optionally screened and introduced with light compaction into a crucible. After final grinding and screening of the calcined cake, a coarse-grained, spherical luminescent material of the general formula $(Ca,Eu)_2Si_8Al_4N_{16}$ is produced. The coarse-grained, spherical luminescent material shown in FIG. 1 has an average grain size $d_{50}$ of 4.7 μm after work-up subsequent to the first calcining operation.

Figure 2A:
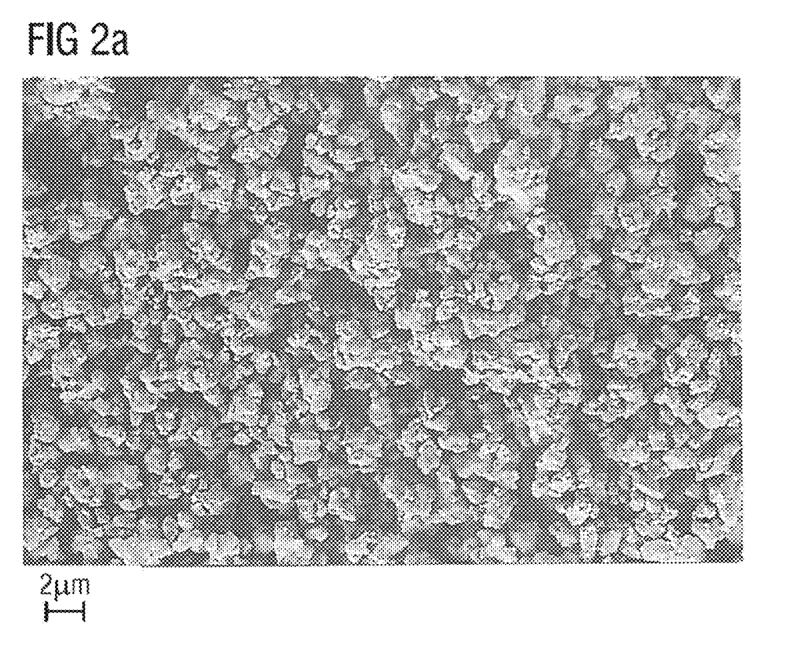
FIGS. 2a and 2b show examples of electron micrographs of pulverulent precursor materials produced using a method according to the invention.
Figure 2B:
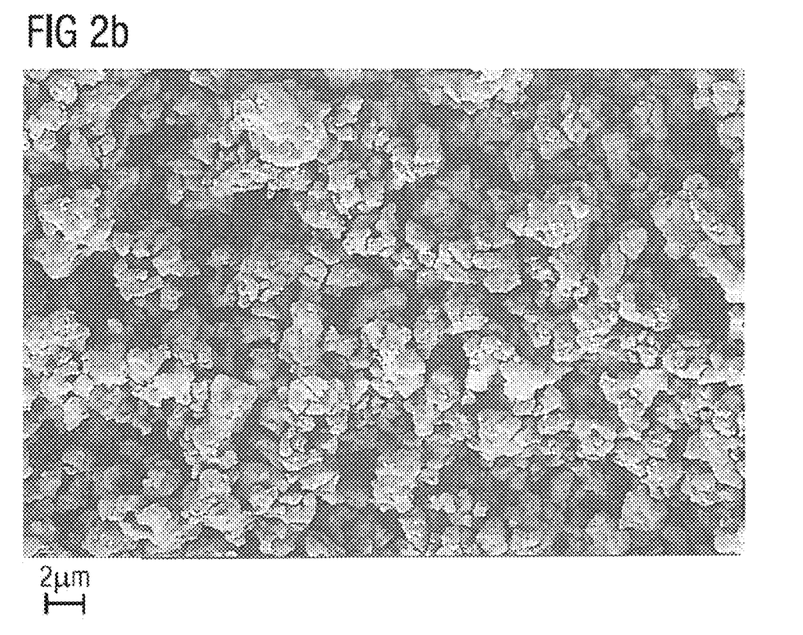

Exemplary Embodiment 1: Production of $(Ca,Eu)_2Si_8Al_4N_{16}$ 39 g $Ca_3N_2$, 66 g AlN, 150 g $Si_3N_4$ (specific surface area roughly 11 $m^2/g$) and 4 g $Eu_2O_3$ are weighed out and homogenised under a protective gas atmosphere. Then the lightly compacted starting material mixture is calcined for several hours under a reducing atmosphere in the tube or chamber furnace at temperatures of between 1300° C. and 1600° C. Then further calcining operations may proceed, likewise under a reducing atmosphere, between 1300° C. and 1600° C. Between the calcining operations, the calcined cake is ground, optionally screened and introduced with light compaction into a crucible. After final grinding and screening of the calcined cake, a finely divided, spherical precursor material is produced, which may for example be used for a ceramic diffusion barrier layer or a ceramic wavelength conversion layer. The precursor material is shown in FIGS. 2a and 2b after work-up of the second calcine. The average grain size $d_{50}$ amounts to 2.2 μm.

Figure 3A:
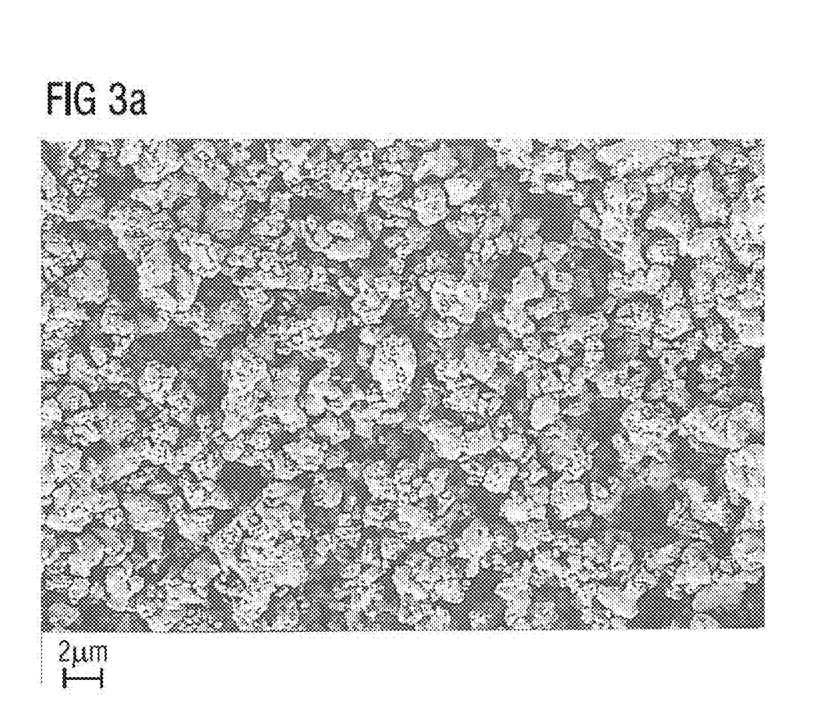
FIGS. 3a and 3b show further examples of electron micrographs of pulverulent precursor materials produced using a method according to the invention.
Figure 3B:
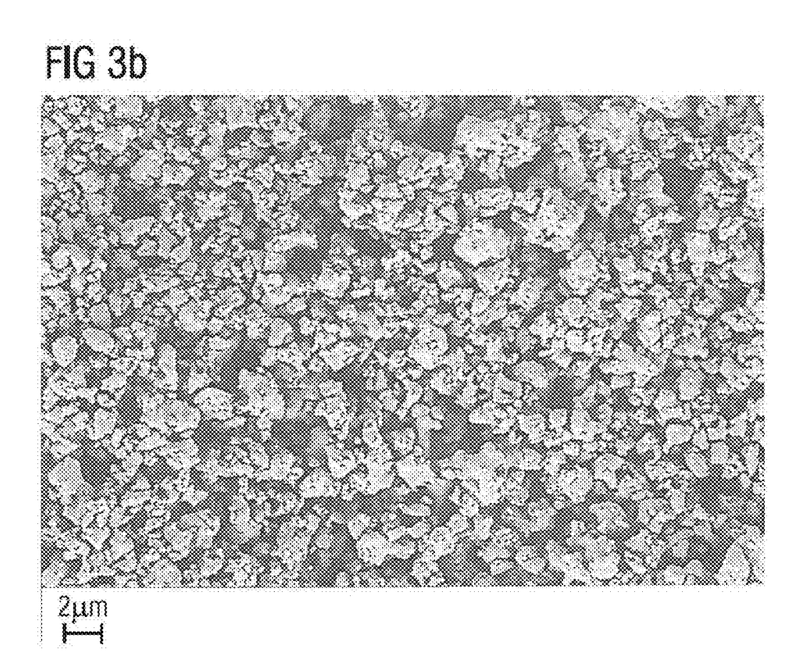

Exemplary Embodiment 2: Production of $(Ca,Eu)SiAl_3ON_{15}$ 98 g $CaCO_3$, 123 g AlN, 421 g $Si_3N_4$ (specific surface area roughly 11 $m^2/g$) and 4 g $Eu_2O_3$ are weighed out. Further production proceeds as described in exemplary embodiment 1. The resultant, finely divided and spherical precursor material, which may for example be used for a ceramic diffusion barrier layer or a ceramic wavelength conversion layer, is shown in FIGS. 3a and 3b after work-up of the first calcine. The average grain size $d_{50}$ amounts to 1.7 μm.

Exemplary Embodiment 3: Production of $CaSiAl_3ON_{15}$ 100 g $CaCO_3$, 122 g AlN and 421 g $Si_3N_4$ (specific surface area roughly 11 $m^2/g$) are weighed out. Further production proceeds according to the explanations in exemplary embodiment 1. The resultant precursor material, which may be used for example in a ceramic diffusion barrier layer, is fine-grained and spherical.

Exemplary Embodiment 4: Production of $Ca_2Si_8Al_4N_{16}$ 50 g $Ca_3N_2$, 82 g AlN and 187 g $Si_3N_4$ (specific surface area roughly 11 $m^2/g$) are weighed out under a protective gas atmosphere. Production proceeds as described in exemplary embodiment 1. The result is a finely divided and spherical precursor material, which may be used in a ceramic diffusion barrier layer. After work-up of the first calcine, the average grain size $d_{50}$ amounts to 1.6 μm.

Figure 4A:
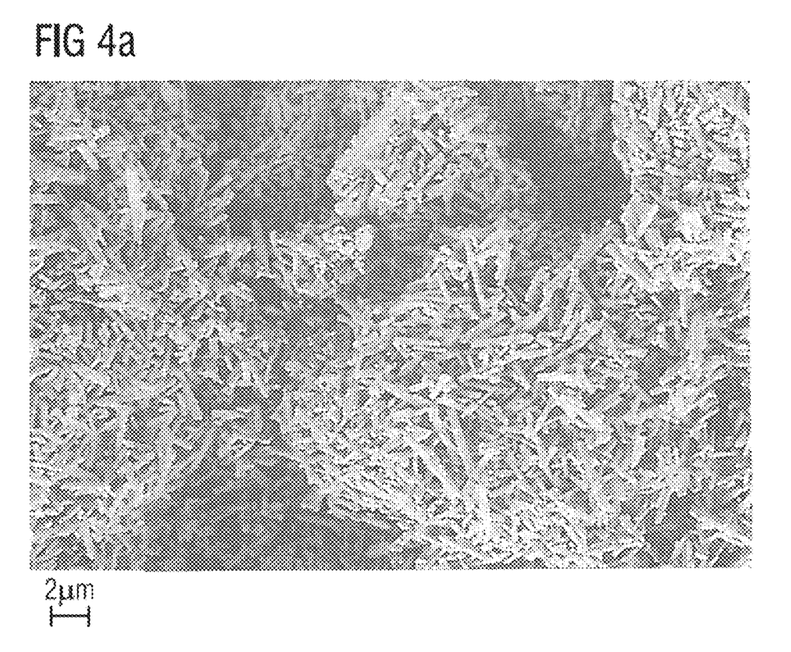
FIGS. 4a and 4b show further examples of electron micrographs of pulverulent precursor materials produced using a method according to the invention.
Figure 4B:
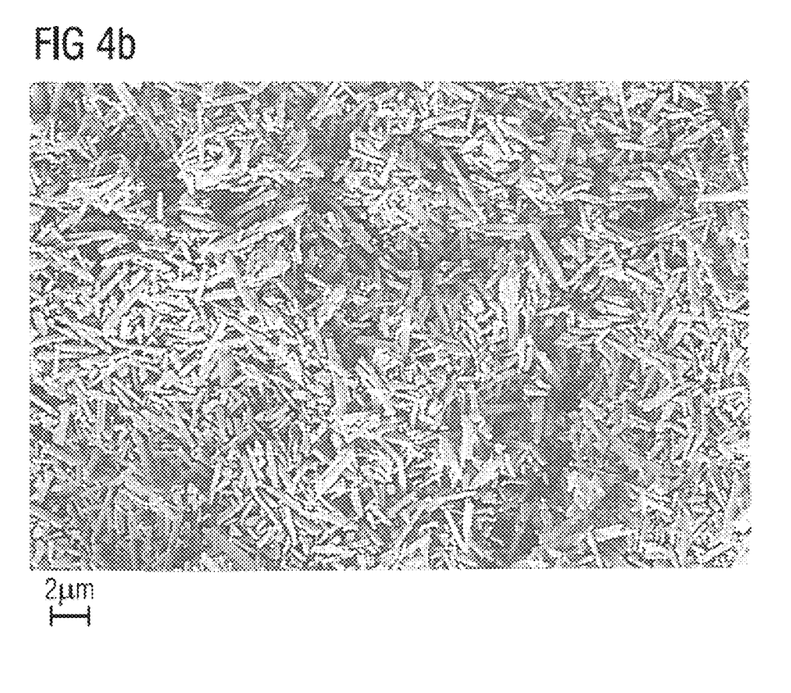

Exemplary Embodiment 5: Production of $(Ca,Eu)_2Si_8Al_4N_{16}$ 39 g $Ca_3N_2$, 66 g AlN, 150 g $Si_3N_4$ (specific surface area roughly 11 $m^2/g$), 2 g $CaF_2$ and 4 g $Eu_2O_3$ are weighed out under a protective gas atmosphere. The added concentration of the fluxing agent $CaF_2$ is crucial for the length or size of the resultant rods and may be between 0.01 mol and 0.2 mol, in particular between 0.01 mol and 0.1 mol. The above-stated weighed-out quantity constitutes an example of a $CaF_2$ concentration of 0.03 mol relative to $Ca_3N_2$. Production of the precursor material proceeds according to exemplary embodiment 1. The result is a fine-grained, rod-shaped or acicular material, which may be used for example in a ceramic diffusion barrier layer or in a ceramic wavelength conversion layer (illustration of the material in FIGS. 4a and 4b). After work-up of the second calcine, the average grain size $d_{50}$ amounts to 0.8 μm. The phase purity of the precursor material was confirmed with XRD measurements.

Tests with different holding times during calcining and different maximum temperatures, which are selected from the range 1300° C. to 1600° C., for example 1400° C., 1450° C., 1550° C., have shown that both parameters have only slight influence on particle size. In terms of the efficiency (QE) of the precursor material, maximum temperature has a greater influence than holding time. As maximum temperature increases, QE increases irrespective of holding time with identical particle size. These trends are illustrated in Table 1 on the basis of the samples produced in exemplary embodiments 1 and 5.

TABLE 1

| EE | CaF$_2$ | T$_{max}$ | Holding time | QE [%] | d$_{50}$ [μm] |
|---|---|---|---|---|---|
| 1 | — | T1 | H3 | 40 | 1.1 |
| 1 | — | T2 | H3 | 46 | 1.3 |
| 1 | — | T3 | H1 | 57 | 1.4 |
| 1 | — | T3 | H2 | 58 | 1.6 |
| 1 | — | T3 | H3 | 60 | 1.6 |
| 5 | ✓ | T1 | H3 | 33 | 0.6 |
| 5 | ✓ | T2 | H3 | 45 | 0.6 |
| 5 | ✓ | T3 | H1 | 67 | 0.5 |
| 5 | ✓ | T3 | H2 | 72 | 0.6 |
| 5 | ✓ | T3 | H3 | 72 | 0.6 |

EE: Exemplary embodiment
T$_{max}$: maximum temperature
T1 < T2 < T3
H1 < H2 < H3

Exemplary Embodiment 6: Production of Ca$_2$Si$_8$Al$_4$N$_{16}$ 50 g Ca$_3$N$_2$, 82 g AlN, 187 g Si$_3$N$_4$ (specific surface area roughly 11 m$^2$/g) and 2 g CaF$_2$ are weighed out under a protective gas atmosphere. In this example, the CaF$_2$ concentration amounts to 0.03 mol relative to Ca$_3$N$_2$. Production of the precursor material corresponds to that stated in exemplary embodiment 1. The result is a fine-grained, rod-shaped precursor material, which may for example be used in a ceramic diffusion barrier layer. The average grain size amounts to approximately 0.7 μm both after work-up of the first and after work-up of the second calcine.

Figure 5A:
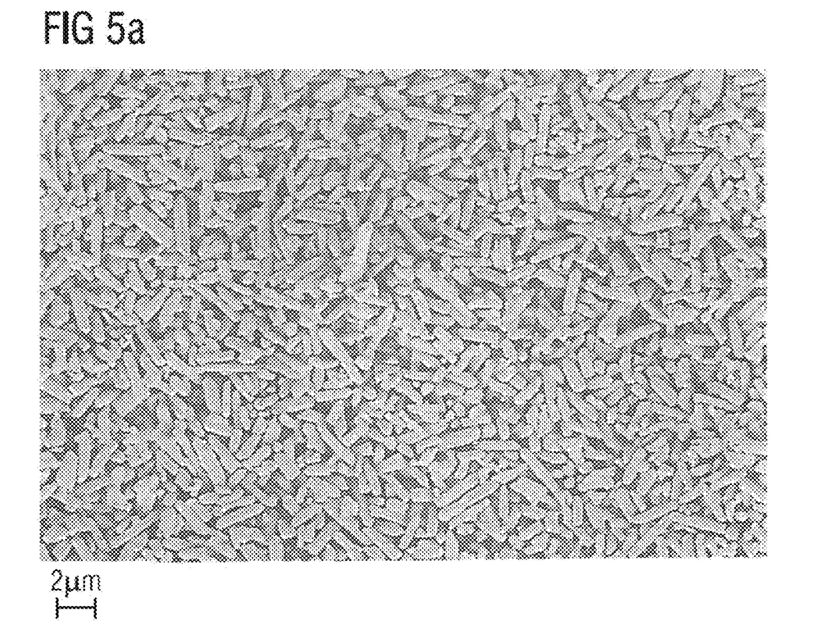
FIGS. 5a and 5b show further examples of electron micrographs of pulverulent precursor materials produced using a method according to the invention.
Figure 5B:
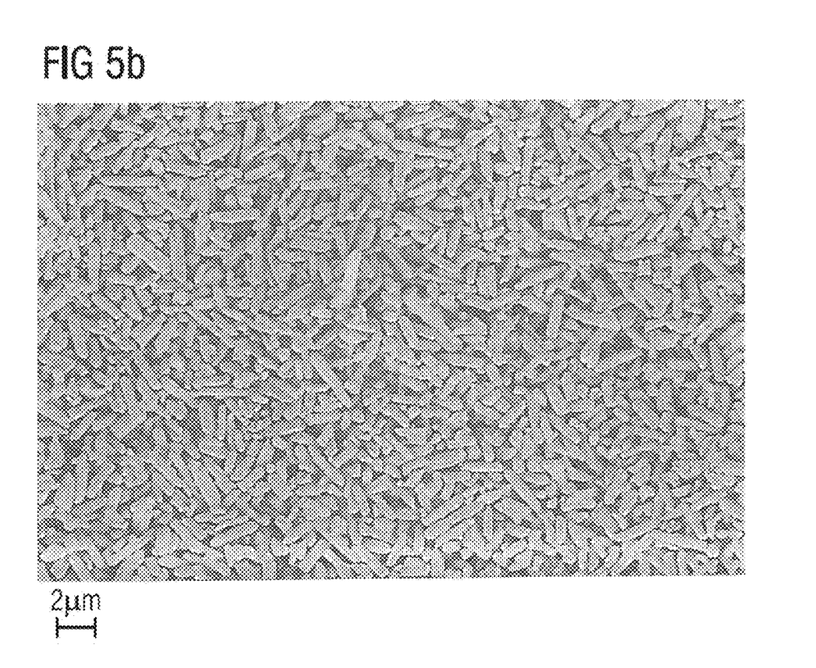

Exemplary Embodiment 7: Production of (Ca,Eu)$_2$Si$_8$Al$_4$N$_{16}$ 39 g Ca$_3$N$_2$, 66 g AlN, 150 g Si$_3$N$_4$ (specific surface area roughly 3 m$^2$/g), 2 g CaF$_2$ and 4 g Eu$_2$O$_3$ are weighed out under a protective gas atmosphere. The concentration of the fluxing agent CaF$_2$ amounts in this example to 0.03 mol relative to Ca$_3$N$_2$. Production of the precursor material proceeds as stated in exemplary embodiment 1. Work-up of the second calcine results in a fine-grained, rod-shaped or acicular precursor material as shown in FIGS. 5a and 5b with an average grain size of 1.1 μm.

Depending on the selection of the starting materials, QE and grain size and the phase purity of the precursor material may be influenced. In contrast to AlN, the particle shape may be varied by purposeful selection of the silicon nitride.

Washing of the finished pulverulent precursor material in acids or bases leads to further improvement in QE. QE may be increased by 7 to 8%, which corresponds to around 5 to 6 percentage points.

Figure 6A:
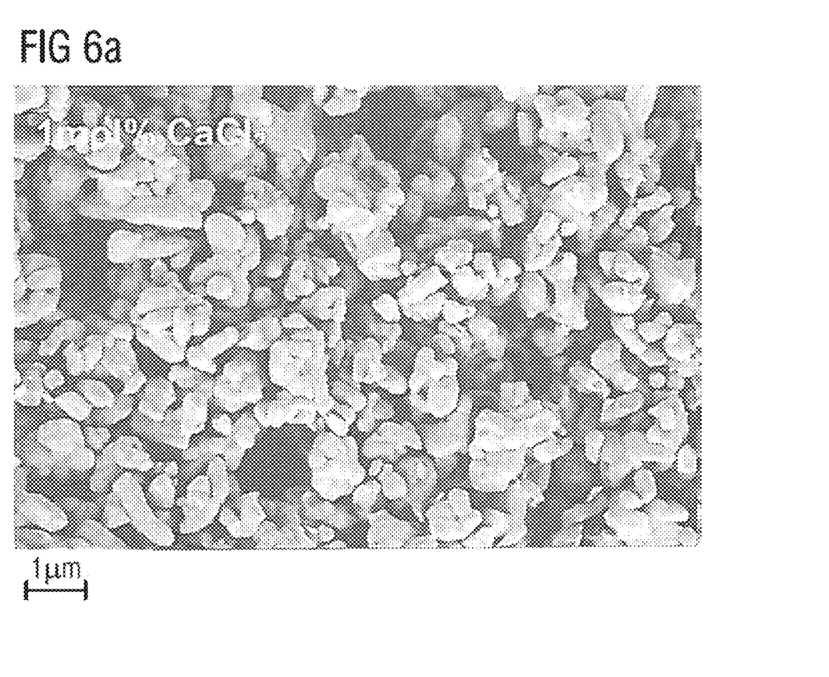
FIGS. 6a and 6b show further examples of electron micrographs of pulverulent precursor materials produced using a method according to the invention.
Figure 6B:
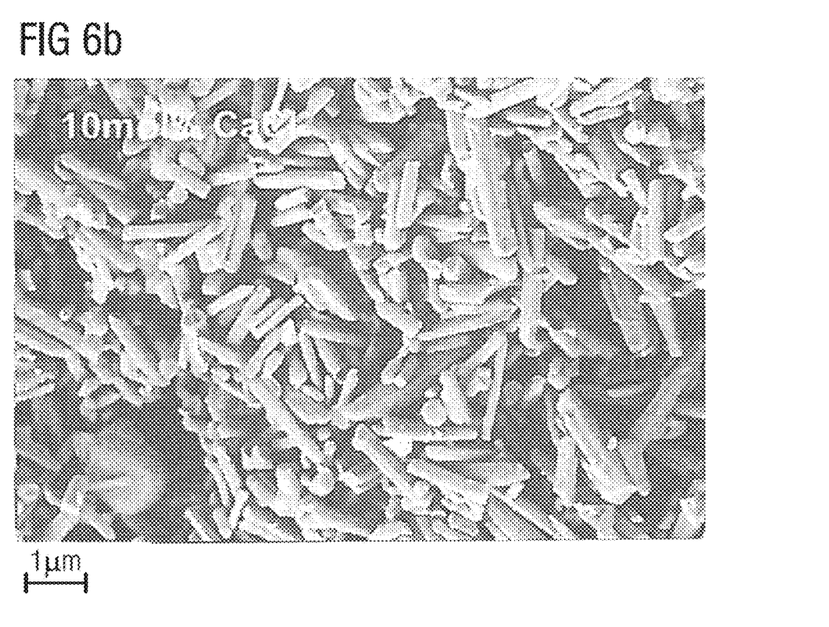

Exemplary Embodiment 8: Production of (Ca,Eu)$_2$Si$_8$Al$_4$N$_{16}$ 39 g Ca$_3$N$_2$, 66 g AlN, 150 g Si$_3$N$_4$ (specific surface area roughly 11 m$^2$/g) and 4 g Eu$_2$O$_3$ are weighed out together with CaCl$_2$ under a protective gas atmosphere. The concentration of fluxing agent CaCl$_2$ amounts to 0.01 mol or 0.1 mol relative to Ca$_3$N$_2$. Production of the precursor material proceeds according to exemplary embodiment 1. The resultant finely divided and rod-shaped precursor material, which may be used for example in a ceramic diffusion barrier layer or a ceramic wavelength conversion layer, is shown in FIG. 6. FIG. 6A shows (Ca,Eu)$_2$Si$_8$Al$_4$N$_{16}$ with 0.01 mol CaCl$_2$ and FIG. 6b shows the material with 0.1 mol CaCl$_2$.

Figure 7A:
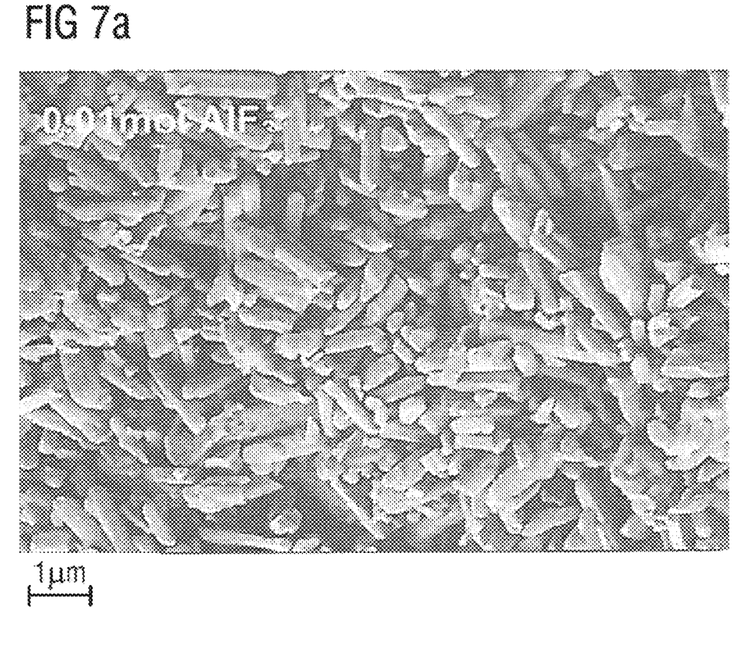
FIGS. 7a and 7b show further examples of electron micrographs of pulverulent precursor materials produced using a method according to the invention.
Figure 7B:
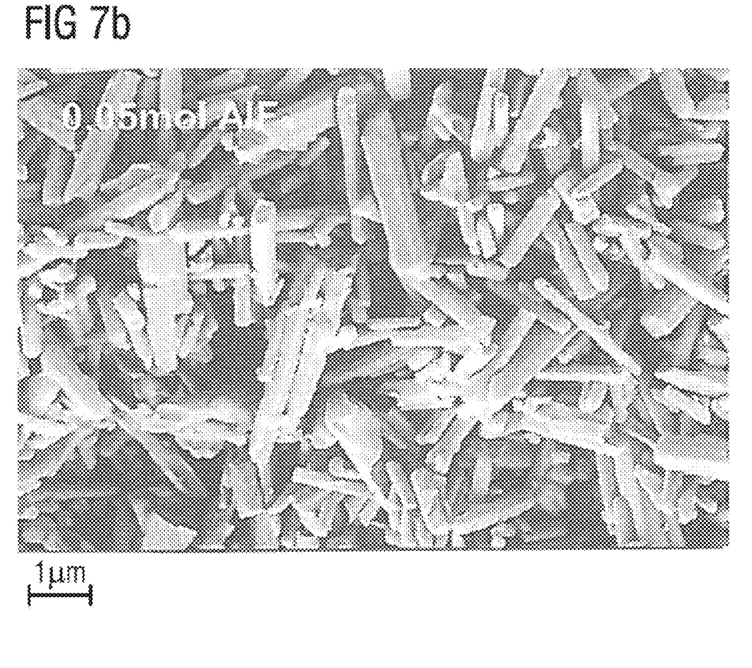

Exemplary Embodiment 9: Production of (Ca,Eu)$_2$Si$_8$Al$_4$N$_{16}$ 39 g Ca$_3$N$_2$, 66 g AlN, 150 g Si$_3$N$_4$ (specific surface area roughly 11 m$^2$/g) and 4 g Eu$_2$O$_3$ are weighed out together with AlF$_3$ with a concentration of 0.01 mol or 0.05 mol relative to Ca$_3$N$_2$ under a protective gas atmosphere. Production proceeds according to exemplary embodiment 1. The result is a fine-grained, rod-shaped precursor, which is shown in FIG. 7 and may be used for example in a ceramic wavelength conversion layer or a ceramic diffusion barrier layer. FIG. 7a shows (Ca,Eu)$_2$Si$_8$Al$_4$N$_{16}$ with 0.01 mol AlF$_3$ and FIG. 7b shows the material with 0.05 mol AlF$_3$.

NH$_4$Cl is a possible further fluxing agent. The addition of NH$_4$Cl results in a finely divided precursor material, the particle size of which reduces as the concentration of fluxing agent, selected from the range of 0.01 to 0.2 mol, increases. Furthermore as the NH$_4$Cl concentration increases, rods are formed from initially spherical particles.

Table 2 below shows the influence of the addition and concentration of fluxing agent on the average grain size values d$_{50}$ and d$_{90}$, quantum efficiency QE and morphology. For these tests, comparable temperature programmes are selected when producing samples.

TABLE 2

| EE | SSA of Si$_3$N$_4$ | Fluxing agent | Fluxing agent conc. | d$_{50}$ [μm] | d$_{90}$ [μm] | QE [%] | Morphology |
|---|---|---|---|---|---|---|---|
| 1 | roughly 11 m$^2$/g | — | — | 2.2 | 4.4 | 67 | Spheres |
| 5 | roughly 11 m$^2$/g | CaF$_2$ | 0.03 mol | 0.8 | 2.7 | 81 | Needles |
| 5 | roughly 11 m$^2$/g | CaF$_2$ | 0.1 mol | 0.7 | 4.0 | 76 | Needles |
| 7 | roughly 3 m$^2$/g | CaF$_2$ | 0.03 mol | 1.1 | 3.0 | 77 | Needles |
| 8 | roughly 11 m$^2$/g | CaCl$_2$ | 0.03 mol | 1.0 | 3.1 | 78 | Rods |
| 8 | roughly 11 m$^2$/g | CaCl$_2$ | 0.1 mol | 0.9 | 5.7 | 78 | Rods |
| 9 | roughly 11 m$^2$/g | AlF$_3$ | 0.03 mol | 0.6 | 2.4 | 77 | Rods |
| 9 | roughly 11 m$^2$/g | AlF$_3$ | 0.05 mol | 0.7 | 2.2 | 75 | Rods |
| — | roughly 11 m$^2$/g | NH$_4$Cl | 0.03 mol | 1.0 | 2.8 | 73 | Spheres |
| — | roughly 11 m$^2$/g | NH$_4$Cl | 0.1 mol | 0.9 | 2.7 | 79 | Rods |

EE: Exemplary embodiment
SSA: Specific surface area
conc.: concentration

QE and d$_{90}$ may be influenced depending on the selection of AlN as starting material. Furthermore, an influence on the phase purity of the precursor material may be observed. The selection of AlN does not have any influence on morphology. The samples illustrated in Table 3 were produced without addition of a fluxing agent. The samples were produced according to the weighing-out of exemplary embodiment 1, wherein in examples 1a and 1b AlN was used in each case with different surface area values.

TABLE 3

| EE | SSA of AlN | QE [%] | d$_{90}$ [μm] |
|---|---|---|---|
| 1 | roughly 3.3 m$^2$/g | 68 | 4.7 |
| 1a | roughly 3 m$^2$/g | 58 | 8.2 |

TABLE 3-continued

| EE | SSA of AlN | QE [%] | $d_{90}$ [μm] |
|---|---|---|---|
| 1b | <2 m²/g | 30 | 14.0 |

EE: Exemplary embodiment
SSA: Specific surface area

QE, morphology and grain size may be influenced, depending on the selection of $Si_3N_4$ as starting material (see Table 4). The incorporation of oxygen into the precursor does not play any part in this respect. Without using a fluxing agent, rod-shaped or spherical precursor material was obtained, depending on the selected $Si_3N_4$. Furthermore, influence on phase purity may be observed depending on the selected $Si_3N_4$. Weighing out of samples 1c and 1d corresponds to that of exemplary embodiment 1, wherein different $Si_3N_4$ were used.

TABLE 4

| EE | SSA of $Si_3N_4$ | QE [%] | $d_{90}$ [μm] | Morphology |
|---|---|---|---|---|
| 1 | roughly 11 m²/g | 68 | 4.7 | Small spheres |
| 1c | roughly 3 m²/g | 53 | 5.9 | Small spheres |
| 1d | roughly 5 m²/g | 58 | 6.5 | Rods |

EE: Exemplary embodiment
SSA: Specific surface area

Washing of the finished precursor material in acids leads to an improved QE. QE may be increased by 7 to 8%, which corresponds to around 5 to 6 percentage points. The influence of washing is visible in Table 5 taking Exemplary embodiment 5 as an example.

TABLE 5

| Acid | QE [%] |
|---|---|
| unwashed | 76.3 |
| $H_3PO_4$ | 79.0 |
| HCl | 80.1 |
| $H_2SO_4$ | 81.7 |

It was thus possible to demonstrate that, through the addition of fluxing agents and through the selection of $Si_3N_4$, the morphology of the pulverulent precursor material produced may be purposefully controlled. This makes it possible to influence not only particle size but also packing density, for example during tape casting. Acid washing operations additionally increase the efficiency of the precursor material, if this is produced as a doped precursor material.

The invention is not restricted by the description given with reference to the exemplary embodiments. Rather, the invention encompasses any novel feature and any combination of features, including in particular any combination of features in the claims, even if this feature or this combination is not itself explicitly indicated in the claims or exemplary embodiments.

The invention claimed is:

1. A method for producing a pulverulent precursor material of the general formula $M1_{2-z}M2_zSi_8Al_4N_{16}$, wherein M1 comprises at least one of Li, Mg, Ca, Y and the group of lanthanoids without Ce and La, M2 comprises at least one of Ce, Pr, Eu, Tb, Yb and Er and wherein $0 \leq z \leq 2$ applies, comprising the method steps
A) producing a pulverulent mixture of starting materials,
B) calcining the mixture under a reducing atmosphere in a tube furnace or chamber furnace and subsequent grinding,
   wherein in method step A) at least one silicon nitride with a specific surface area of more than 2 m²/g to 11 m²/g is selected as starting material,
   wherein the calcining in method step B) is carried out at a temperature selected from the range of 1300° C. to 1600° C., and
   wherein the pulverulent precursor material is produced with an average grain size d50 which is less than 2.3 μm.

2. The method according to claim 1, wherein method step B) is carried out at least once.

3. The method according to claim 1, wherein the calcining in method step B) includes a holding time selected from the range of 1 minute to 24 hours.

4. The method according to claim 1, wherein $Si_3N_4$ is selected as the silicon nitride in method step A).

5. The method according to claim 1, wherein in method step A) at least one fluxing agent is added to the mixture of starting materials.

6. The method according to claim 5, wherein the fluxing agent is selected from a group comprising boric acid, borates, chlorides, fluorides and mixtures thereof.

7. The method according to claim 5, wherein the fluxing agent is added in a concentration selected from the range of 0.001 mol to 0.2 mol.

8. The method according to claim 1, wherein in a method step C) following method step B) the pulverulent precursor material is washed in base and/or acid.

9. A method for producing a pulverulent precursor material of the general formula $M1_xM2_y(Si,Al)_{12}(O,N)_{16}$, wherein M1 comprises at least one of Mg, Ca, Y and the group of lanthanoids without Ce and La, M2 comprises at least one of Ce, Pr, Eu, Tb, Yb and Er and wherein $0.3 \leq x+y \leq 1.5$ and $0 \leq y \leq 0.7$ apply, comprising the method steps:
A) producing a pulverulent mixture of starting materials,
B) calcining the mixture under a reducing atmosphere in a tube furnace or chamber furnace and subsequent grinding,
   wherein in method step A) at least one silicon nitride with a specific surface area of more than 2 m²/g to 11 m²/g is selected as starting material,
   wherein the calcining in method step B) is carried out at a temperature selected from the range of 1300° C. to 1600° C., and
   wherein the pulverulent precursor material has an average grain size d50 which is less than 2.3 μm.

* * * * *